Figure 7:
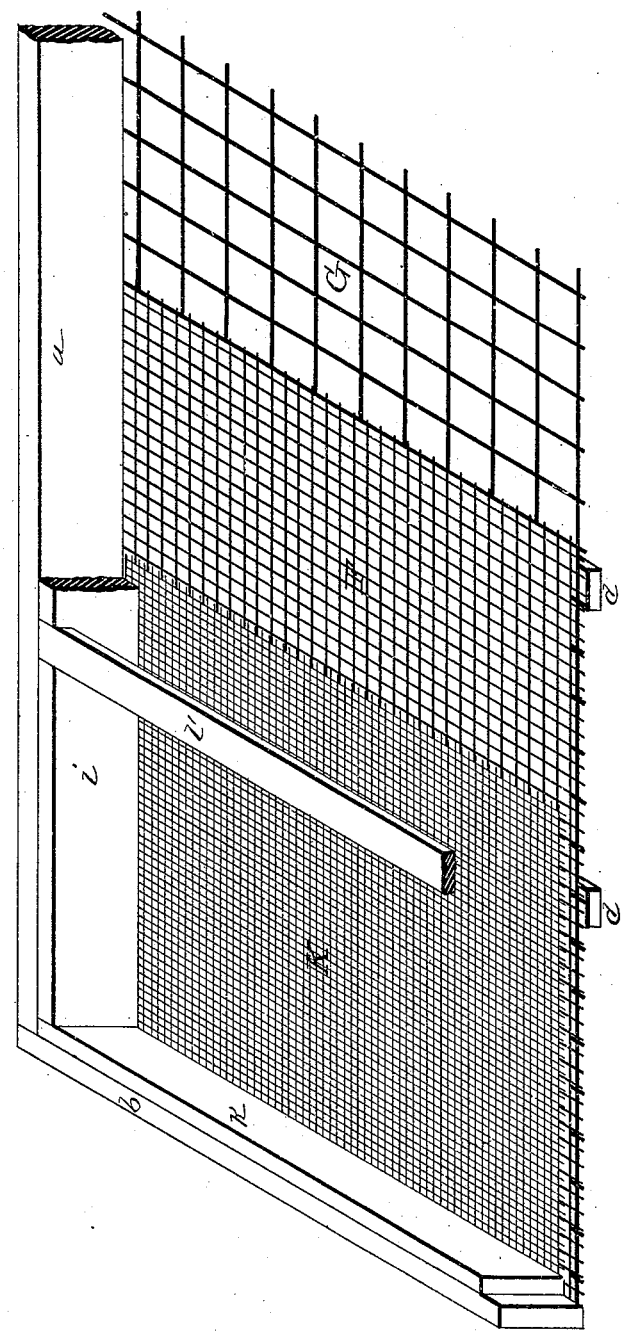

(No Model.)　　　　　　　　　　　　　　　3 Sheets—Sheet 1.
F. H. KIMBALL.
STARCH SEPARATOR.
No. 275,340.　　　　　　　　Patented Apr. 3, 1883.
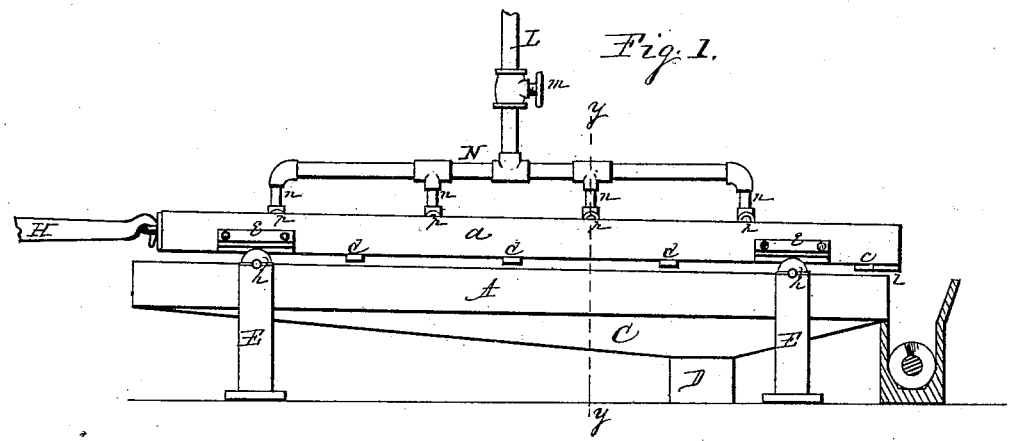
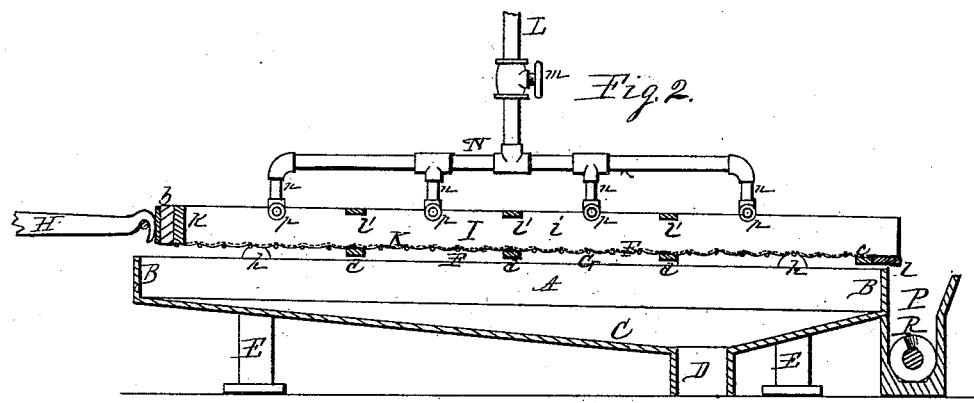
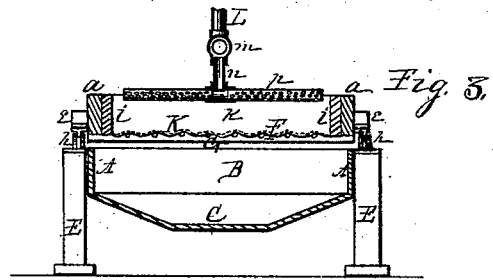

(No Model.)  3 Sheets—Sheet 2.
F. H. KIMBALL.
STARCH SEPARATOR.
No. 275,340.  Patented Apr. 3, 1883.
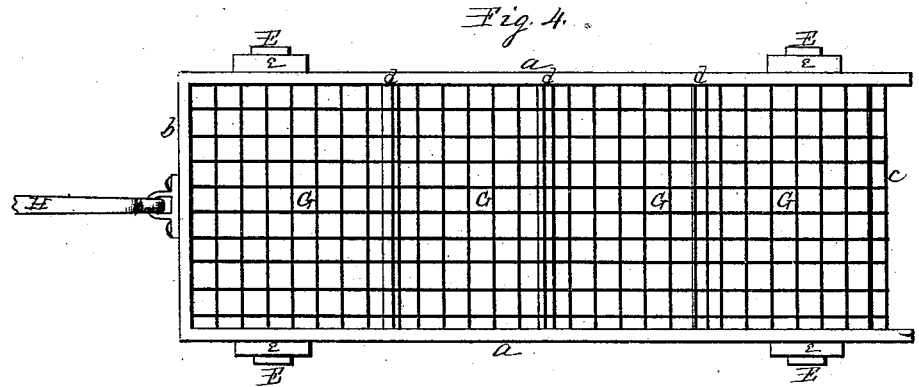
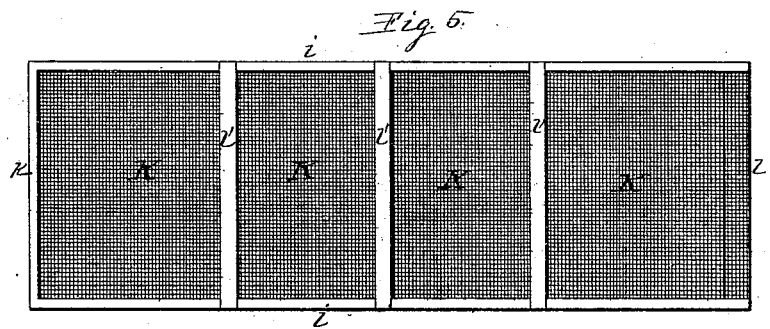
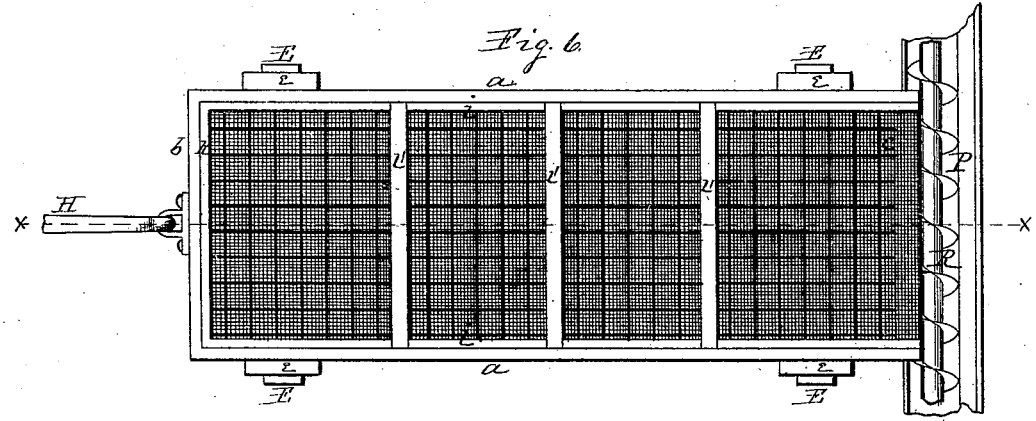

(No Model.)  3 Sheets—Sheet 3.

F. H. KIMBALL.
STARCH SEPARATOR.

No. 275,340. Patented Apr. 3, 1883.

Witnesses.
A. O. Behel
Israel Sovereign

Inventor.
Frank H. Kimball
Per Jacob Behel,
Atty.

UNITED STATES PATENT OFFICE.

FRANK H. KIMBALL, OF ROCKFORD, ILLINOIS, ASSIGNOR OF ONE-HALF TO ANDREW M. JOHNSTON, OF SAME PLACE.

STARCH-SEPARATOR.

SPECIFICATION forming part of Letters Patent No. 275,340, dated April 3, 1883.

Application filed June 13, 1882. (No model.)

*To all whom it may concern:*

Be it known that I, FRANK H. KIMBALL, a citizen of the United States, residing in the city of Rockford, in the county of Winnebago and State of Illinois, have invented new and useful Improvements in Starch-Separators, of which the following is a specification.

This invention relates to separators employed in the manufacture of starch and glucose to separate the starch from the bran or other refuse; and it consists mainly in the construction of a sieve for the purpose.

The object of my invention is to produce a sieve employing bolting-cloth or other equivalent fabric as the sieve material, supported in such a manner as to relieve it from undue strains and to guard against the rapid wearing of the sieve material. To this end I have designed and constructed the sieve represented in the accompanying drawings, in which—

Figure 1 is a side elevation of a starch-separator embodying my invention, of which Fig. 2 is a lengthwise central vertical section on dotted line *x*. Fig. 3 is a transverse vertical section on dotted line *y*. Fig. 4 is a plan view of the sieve-supporting frame. Fig. 5 is a plan view of the sieve. Fig. 6 is a plan view of the sieving apparatus complete, and Fig. 7 is an isometrical fragmental section of the sieves enlarged to more clearly show their several parts.

In the accompanying drawings, A represents the sides, and B the ends, of a receptacle of rectangular box-form, provided with a hopper-formed bottom, C, terminating in a central outlet discharge-pipe, D. This receptacle is supported in a slightly-inclined position in the direction of its length on suitable standards or supports, E.

At *a* are represented the sides, and at *b* the end portions, of an outer sieve-frame, which are of wood, of suitable dimensions, having their ends securely fixed to each other, producing three sides of a frame. The free ends of the side portions of this frame are joined by means of a transverse bar, *c*, fixed to their under edges. These parts constitute an outer sieve-frame rectangular in plan.

At F is represented an open-woven fabric—such as bunting, cheese-cloth, mosquito-bar, tarlatan, mull, or even open-woven sheeting, or other like fabrics. This goods is placed on the under surface of the outer sieve-frame, having its edges tacked or otherwise fixed to to the under edges of the sides *a* and head ends *b*, and its discharge end is fixed to the upper surface of the transverse end bar, *c*.

At G is represented a wire webbing or twine fabric, very open in its structure, with meshes of large dimensions. This webbing, preferably of wire, is placed in a well-taut manner on the under surface of the outer sieve, having its side and head-end edges fixed to the under edges of the sides *a* and head end *b* by means of nailing or in other suitable manner, and the discharge end of this webbing is fixed to the upper surface of the transverse under end bar, *c*. This webbing is supported at proper intervals by means of transverse bars *d*, which span the frame on the under surface of the webbing, having their ends securely fixed to the under edges of the sides *a* of the sieve-frame.

At *e* are represented slide-supports fixed to the end portions of the sides *a* of this outer sieve, having their under face tongued to engage the grooved periphery of rollers *h*, journaled in the upper ends of the standard-supports E. These parts engage each other in such a manner as to support this outer sieve in position over the receptacle in such a manner as to permit a limited endwise movement of the sieve in an inclined plane substantially parallel to the plane of the receptacle.

At H is represented a portion of a pitman, having a suitable hinge-connection with the head end of the sieve, and is designed to have a suitable crank or eccentric connection to impart a reciprocating or shivering endwise movement to the sieve.

At *i* are represented sides, and at *k* the head end portion, of an inner sieve-frame, which are of wood, of suitable dimensions, having their ends securely fixed to each other, producing three sides of a sieve-frame. The free ends of the side portions of this sieve-frame are joined by means of a transverse bar, *l*, fixed to their under edges. These parts constitute an inner sieve-frame rectangular in plan, and of a size to snugly enter the outer sieve-frame.

At K is represented a sieve-cloth, preferably of that variety known as "bolting-cloth." This sieve or bolting cloth is placed on the under side of this inner sieve-frame in a manner suitably taut, having its side and head-end edges fixed to the under edges of the sides *i* and head end *k*, and its tail end to the upper face or outer edge of the transverse bar *l* by means of tacks driven through the cloth into the frame, or in any other suitable manner.

At *l'* are represented transverse bars, having their ends let into the upper edges of the sides *i* of the inner sieve-frame, to which they are securely fixed, and are employed to support the sides in their parallel position. This sieve is then placed in position in the outer sieve in such a manner that the sieve-cloth K will rest on the open-woven fabric F, fixed to the outer sieve-frame.

At L is represented a water-induction pipe, having a suitable connection with the water-supply. This induction-pipe is provided with stop-cock *m*, by means of which the flow of water through the induction-pipe may be regulated.

At N is represented a horizontal pipe, extending lengthwise centrally over the sieves, having its central portion suitably joined to the induction-pipe.

At *n* are represented pendent pipes, having a suitable connection with the horizontal pipe N at proper intervals. These pendent pipes connect centrally with transverse pipes or troughs *p*, which extend laterally over the sieve, suspended in a suitable manner. These transverse or lateral pipes *p* are suitably perforated to distribute the water over the sieve in a proper manner. The several pendent pipes, *n*, if desired, may each be provided with a suitable stop-cock, for the purpose of better regulating the distribution of flow of water over the sieve.

At P is represented a conveyer-trough, formed below the tail end of the sieve in position to receive the refuse discharged therefrom over its open end. This trough is provided with a suitable conveyer, R, employed to convey the refuse to a receptacle provided for its reception.

From the foregoing it will be seen that I produce a sieve in which the bolting-cloth is supported upon a more open, coarse, and stronger fabric, which in turn is also supported upon a still more open, coarser, and stronger fabric, by which arrangement the bolting-cloth can be employed at a less tension, and will be relieved from undue strains, and consequently will render greater service.

In this instance I have represented my improved sieve as having a suitable webbing between the supporting under fabric and the bolting-cloth, which construction and arrangement I prefer; but this center webbing may be omitted, in which instance the bolting-cloth will be supported directly on the under fabric.

In this construction of my improved sieve I prefer to reduce the size of the meshes in the supporting-fabric, by which I produce a durable and efficient sieve. It will be observed that in either construction the bolting-cloth will be supported in such a manner as to render it much more serviceable than when employed in the usual manner. It will also be noticed that in either form of my improved sieve, (employing the single bolting-cloth, or the bolting-cloth with the intermediate fabric in connection with the under-supporting fabric,) in use these upper fabrics, by reason of the slackness of their tension, will, under the weight of the material on the sieve, be depressed in the meshes of the supporting-fabric, forming a series of depressions or pockets to receive the material in the sieve, which, in connection with the reciprocating or shivering movement of the sieve, will produce a shuffling or throwing movement to the contents of the sieve, which renders it much more efficient as a starch-separator.

In use the material to be separated is introduced into the head of the sieve, preferably in a thin sheet about the full width of the sieve; and by means of the stop-cock a suitable quantity of water is distributed over the sieve through the perforated tubes, and by reason of the reciprocating or endwise shivering movement of the sieve the starch will be separated and washed through the sieves into the receptacle, to be conducted through the discharge-outlet to be conducted to a suitable receptacle prepared to receive it, and the bran and other refuse will be carried over the open end of the sieve and discharged into the conveyer-trough to be delivered by the conveyer into a suitable receptacle.

I claim as my invention—

1. The combination, in a starch-separator, of a sieve-supporting fabric and a separating sieve-fabric, said sieve-fabric supported on the supporting-fabric, substantially in the manner and for the purpose set forth.

2. The combination, in a starch-separator, of a sieve-supporting fabric, a separating sieve-fabric, and an intermediate sieve-supporting fabric, said several fabrics arranged and combined substantially in the manner and for the purpose set forth.

3. The combination, with an outer sieve-frame provided with a sieve-supporting fabric, of an inner sieve-frame provided with a separating sieve-fabric, said inner sieve-frame adapted to enter within the outer frame to support the separating sieve-fabric on the supporting-fabric of the outer frame, substantially in the manner and for the purpose set forth.

4. The combination, substantially as hereinbefore set forth, of an outer sieve-frame provided with a sieve-supporting fabric, and inner sieve-frame provided with a separating sieve-fabric, and adapted to enter within the outer sieve-frame to support the separating sieve-fabric on the supporting-fabric of the outer frame, said sieve-supporting fabric and said separating sieve-fabric separated by an intermediate or center sieve-supporting fabric, substantially in the manner and for the purpose set forth.

FRANK H. KIMBALL.

Witnesses:
R. W. EMERSON,
A. O. BEHEL.